United States Patent [19]
Johnson

[11] Patent Number: 5,053,866
[45] Date of Patent: Oct. 1, 1991

[54] METHOD AND AN ASSOCIATED APPARATUS FOR CALIBRATING A COLOR DIGITAL HARDCOPY DEVICE

[75] Inventor: Stephen E. Johnson, Pittsford, N.Y.

[73] Assignee: Eastman Kodak Company, Rochester, N.Y.

[21] Appl. No.: 388,451

[22] Filed: Aug. 2, 1989

[51] Int. Cl.$^5$ .............................................. H04N 1/46
[52] U.S. Cl. ......................................... 358/75; 358/80
[58] Field of Search ..................... 358/76, 75, 80, 406, 358/463

[56] References Cited

U.S. PATENT DOCUMENTS

| | | | |
|---|---|---|---|
| 4,710,785 | 12/1987 | Mills | 358/406 X |
| 4,751,569 | 6/1988 | Clinton et al. | 358/76 X |
| 4,779,106 | 10/1988 | Mills | 358/406 X |
| 4,929,978 | 5/1990 | Kanamori et al. | 358/80 X |

OTHER PUBLICATIONS

Authors—T. O. Maier and C. E. Rinehart, Title—"Design Criteria for an Input Color Scanner Evaluation Test Object", Data—May 2-3, 1988, Presented at TAGA Conference.

*Primary Examiner*—Kenneth A. Wieder
*Assistant Examiner*—Glenn W. Brown
*Attorney, Agent, or Firm*—Edward Dugas

[57] ABSTRACT

The present invention is designed to operate with a digital imaging device which reproduces in hardcopy an original color image. In order to make high quality reproductions, that is reproductions which correspond in finished color to the color of the original image, the method of the present invention operates upon the original color densities with a color correction module that has as its input the desired red, green, and blue densities, and which outputs the modified red, green, and blue densities which can be considered to be channel-independent aim control signals for the imaging device. In the event that external conditions change which prevent the desired red, green, and blue densities from being achieved when the color correction module is utilized, a neutral adjustment module is activated which takes as its inputs the red, green, and blue aim control signals from the color correction module and outputs adjusted red, green, and blue signals which are directed to the imaging device. The derivation of the parameters for the neutral adjustment module is accomplished by the production of a hardcopy image of neutral color patches. The densities of the patches are measured and provided to the color correction module to determine the correct relationships between red, green, and blue signals output from the color correction module and the resulting densities.

32 Claims, 6 Drawing Sheets

METHOD AND AN ASSOCIATED APPARATUS FOR CALIBRATING A COLOR DIGITAL HARDCOPY DEVICE

BACKGROUND OF THE INVENTION

1. Field of the Invention

The present invention is generally directed to the field of devices which generate color image copies from color image originals and, more particularly to a method and an associated apparatus for calibrating such types of devices.

2. Description of Related Art

It is general practice to describe the results desired for a color hardcopy in terms of the measurable quantity, hereafter referred to as density. The density values are for the three primary colors, red, green and blue.

When an original image is to be copied, it is desired to convert the requested density, for all three primary colors, into the three independent code values, appropriate for the writing device, that would produce the correct densities in the hardcopy. In general, a code value that produces a specific measured density in a neutral tone will not produce the same measure density in a color. For example:

If the combination of red, green, and blue code values

X1  Y1  Z1 produce measured red, green, and blue densities

R1  G1  B1 then the red code value X1, if used in conjunction with green and blue code values Y2 and Z2, will not in general produce the measure density R1.

Therefore, the proper choice of code value for the desired density of one color depends on the desired densities of the other two colors. In other words, the system is not channel independent. In photographic (film) products, this is caused primarily by inter-layer inter-image effects (IIE) resulting from non-linear chemical interactions among the sensitized layers during chemical development.

A prior art patent of interest is U.S. Pat. No. 3,801,736 entitled "Color Reproduction Method In a Halftone Dot" by T. Kosaka, et al. The method disclosed in that patent operates upon an original having halftone dots of three different colors superimposed on layers of transparent material with predetermined thicknesses. In order to correctly characterize the color of the original, halftone dot equations, which incorporate the thicknesses of the transparent layers as at least one element, are used for providing a correction factor prior to the printing of the dot images onto a copying surface.

Another patent of interest is U.S. Pat. No. 4,060,829 entitled "Method of Color Correction" by T. Sakamoto, wherein color separation signals obtained by scanning a color original are compressed to the color ranges reproducible by printing inks by a color correction circuit and converted to digital signals which are utilized as addressing signals for addressing a memory containing correction signals whereby suitable correction signals can be applied to the device for forming the color image from the original.

In U.S. Pat. No. 4,075,662 entitled "Method and System for Compensating the Non-Linearities in a Reproduction Process" by W. Gall, there is shown a system for reproducing an image scanned from an original by a sensing device and for recording the scanned image to later make a copy of the original image. The patent is directed to a method for compensating for deviations in the gray scale level reproduction of the copied image caused by non-linearities in the process.

In U.S. Pat. No. 4,409,614 entitled "Method for the Reproduction of Originals Which, With Respect to Their Color Content, are Scanned According to a Tristimulus Method" by H. Eichler, there is disclosed the use of a 9-element correction matrix and the conversion of signals into separation densities based upon neutral reproductions.

From the foregoing, it can be appreciated that devices of the type that create hardcopy images from original image media, such as film, inherently contain components which cause the copied image not to correspond in terms of color density on a one to one basis with the original image. The differences and/or variations are caused by a number of factors, for example temperature, different film types, non-linearities in the system, noise generated by the system and, of course, the interaction between the different color channels which causes the human eye to perceive differences between the original and the copy version.

The source of the digital image must be calibrated to provide signals (densities) equal to that which would be observed by physically scanning or measuring the produced hardcopy, therefore, it is desired to determine a relationship (algorithm, function, or 3-dimensional look-up table) that will predict the proper three code values that, when used together, produce the desired three densities. This relationship is valid only for the specific conditions (exposure, photographic processing, environmental conditions, etc.) under which it was derived. For critical work, normal variations in the photographic process and environmental conditions may cause the relationship to fail.

SUMMARY OF THE INVENTION

The present method permits the continued use of an established relationship even when the process or external conditions change. In the case of reproduction onto photographic products, it utilizes the fact that color interactions (IIE) are relatively independent of processing chemistry and, as such, are unaffected by normal short-term variations experienced in photographic processes. The calibration of the device is therefore broken down into two components, hereafter referred to as "color calibration" and "neutral calibration".

Since for most applications errors in colors that are neutral or near-neutral are more objectionable than are equal numeric errors in saturated colors, a step in this new method is to establish an "aim" neutral response curve. The neutral response curve is the collection of all achievable neutral colors ranging from the minimum density to the maximum density. If the correct code values to produce that neutral curve can be determined, then a relationship can be developed that relates the densities in the neutral scale to the densities in non-neutral colors that result from the same code values. This relationship becomes the "color calibration" and can take the form of an algorithm, a series of functions, or more directly, a 3-dimensional look-up table used in conjunction with a method of interpolation. Once established, the relationship will convert the desired densities for a specific color to another set of densities associated with the "aim" neutral response curve. These converted densities are then mapped through three independent 1-dimensional look-up tables created by reversing the aim code value to density results for the neutral response curve. The resulting aim code values can be further modified by mapping through 1-dimensional look-up tables to compensate for short-term changes in the film process or other external conditions. This "neutral calibration" will result in the correct code values needed to produce the desired densities in the hardcopy, both for the critical neutral and near-neutral colors as well as the more saturated colors.

The determination of a full calibration function can be time consuming and expensive, and is burdensome if required to correct for short-term variations in photographic processing or other external conditions. Therefore, a distinct advantage exists if frequent calibration is done only to maintain the "aim" neutral response. Since the "color calibration" is closely related to the IIE effects, which are relatively insensitive to process variations, the full calibration need not be done on a frequent basis, and only "neutral calibration" is required.

More specifically, from the foregoing it can be seen that it is a primary object of the present invention to provide an improved method and an associated apparatus for forming an image on a photographic hardcopy based on an original image source.

It is a further object of the present invention to provide a method and an associated apparatus for compensating for variations in a density calibration model which utilizes a neutral calibration component for correcting for short-term characteristic conditions.

These and other objects of the present invention will become more apparent when taken in conjunction with the following description and drawings, wherein like characters indicate like parts and which drawings form a part of the present disclosure.

DESCRIPTION OF THE PREFERRED EMBODIMENTS

Figure 1:
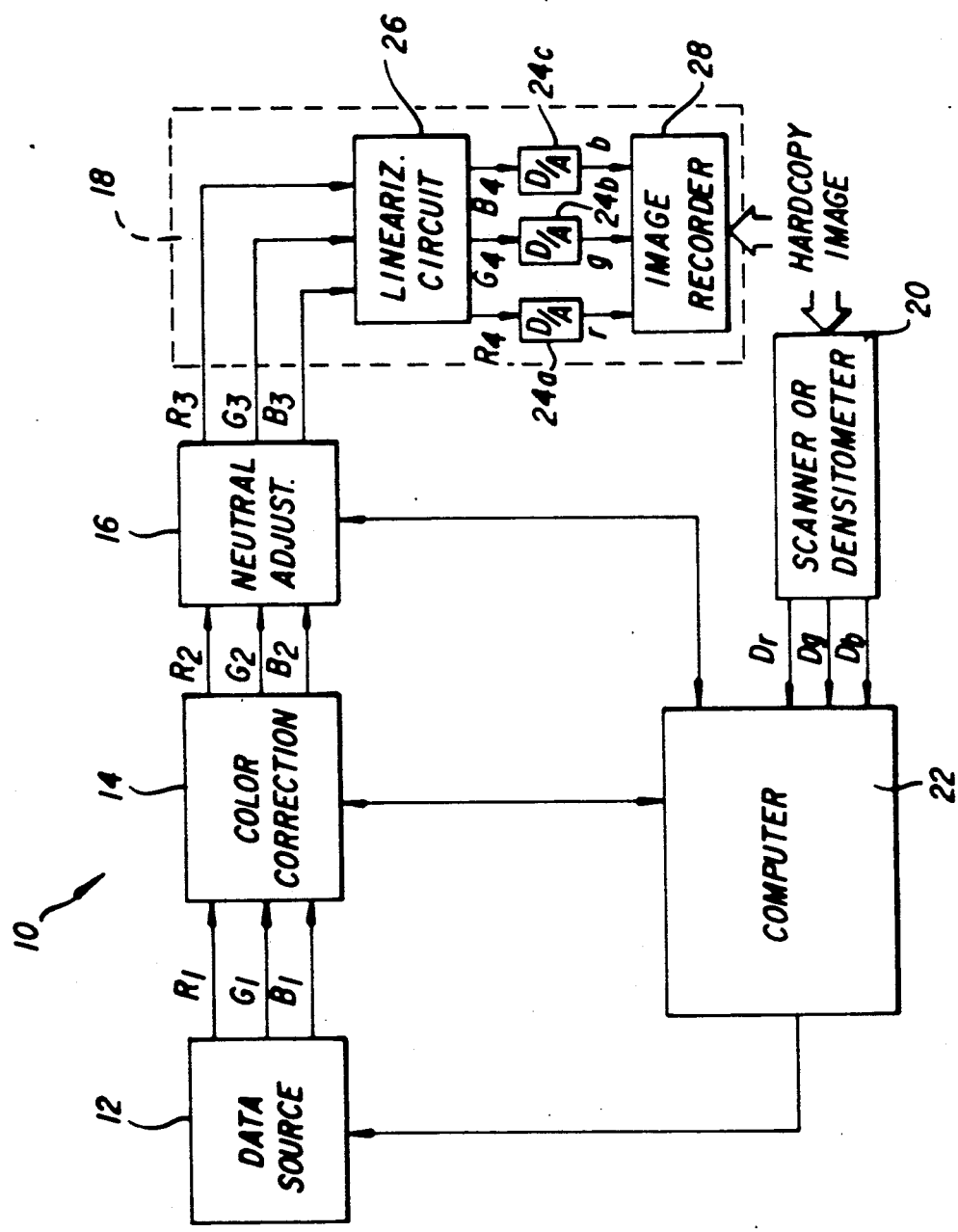
FIG. 1 is a schematic block diagram of a preferred apparatus of the present invention.

Referring to FIG. 1, the system 10 for converting a digital data image into a hardcopy image is shown comprised of a data source 12 which may be a system for converting a hardcopy color image and, for example, a film negative of a color image into three primary electrical signal components designated R1, G1, and B1. These signals are directed to color correction circuitry 14 upon command from a computer 22. The color correction circuitry 14 provides correction to each of the individually channeled signals utilizing a method to be discussed in more detail later in the specification, and provides at its outputs, three primary color signals corrected, R2, G2, and B2. These signals are directed to a neutral adjustment circuit 16 which also receives as inputs a control signal from the computer 22. The output signals from the neutral adjustment circuit 16 are denoted R3, G3, and B3. These signals are provided as code values to an imaging system 18, which normally incorporates linearization circuitry 26 and three D/A converters 24a through 24c which convert the digital outputs R4, G4, and B4 from the linearization circuitry 26 into analog signals. Alternately, a single D/A converter can be utilized with multiplexed inputs and the appropriate control signals. The analog signals are denoted r, g, and b. These signals are directed as inputs into an image recorder 28 or other hardcopy media recording device, which transforms the electrical signals received on its input into signals that cause the generation of a hardcopy of the film in accordance with the information contained in the input signals. A scanner and/or alternately a densitometer 20 reviews the hardcopy produced by the image recorder 28, and in the case of photographic film, after the chemical development process, to generate density signals identified as $D_r$, $D_g$, and $D_b$. These signals are provided as inputs to the computer 22.

The image recorder device 28 uses three independent exposing channels driven by the analog signals (r, g, b) creating hardcopy densities ($D_r$, $D_g$, $D_b$). Because of channel interdependencies, $D_r = h_r(r, g, b)$
$D_g = h_g(r, g, b)$
$D_b = h_b(r, g, b)$.

These interdependencies in the resulting densities are a property of the hardcopy recording media; for example, if the media is photographic film, the interdependencies are attributable to inter-layer development effects which occur during the physical development of the film image.

Assuming that (r, g, b) are analog equivalents of digital signals to the D/A converter(s) 24a through 24c then, $D_r = h_r(R4, G4, B4)$
$D_g = h_g(R4, G4, B4)$
$D_b = h_b(R4, G4, B4)$.

The linearization circuitry 26 provides channel-independent conversion of the signals (R3, G3, B3) to the signals (R4, G4, B4) such that, $R4 = g_r(R3)$
$G4 = g_g(G3)$
$B4 = g_b(B3)$.

The linearization circuitry 26 provides the means to obtain a linear or near-linear response in output densities ($D_r$, $D_g$, $D_b$) from the imaging device input signals (R3, G3, B3) for signals satisfying the condition: R3=G3=B3.

The linearization circuitry 26 may be preset for a specific output media and operation condition, or it may be user adjustable. It normally consists of three independent 1-dimensional look-up tables which provide an output R4 for every possible input signal R3, an output G4 for every possible input signal G3, and an output B4 for every possible input signal B3. If the imaging system 18 does not include the linearization circuitry 26, the linearization transform can be performed by the neutral adjustment circuitry 16, which also consists of three independent 1-dimensional look-up tables.

It is desired that digital data (R1, G1, B1) be provided to the system to obtain resulting film densities ($D_r$, $D_g$, $D_b$) in a channel independent manner such that, $D_r = f_r(R1)$
$D_g = f_g(G1)$
$D_b = f_b(B1)$;

it follows that, $R1 = f_r^{-1}(D_r)$
$G1 = f_g^{-1}(D_g)$
$B1 = f_b^{-1}(D_b)$.

In the simplest case, the signals (R1, G1, B1) are digital representations of the desired densities ($D_r$, $D_g$, $D_b$) and $R1 = D_r$
$G1 = D_g$
$B1 = D_b$.

The channel interdependencies of the output densities ($D_r$, $D_g$, $D_b$) to the analog signals (r, g, b) requires a conversion of the input values (R1, G1, B1) to the actual signals (R3, G3, B3), which after conversion by the linearization circuitry 26 of the imaging device 18 to signals (R4, G4, B4), that are required to produce the desired densities ($D_r$, $D_g$, $D_b$) on the subsequent hardcopy image. This signal conversion is embodied by the color correction circuitry 14 and the neutral adjustment circuitry 16.

The color correction circuitry 14 implements an empirically-derived function or series of functions or alternately an empirically-derived 3-dimensional look-up table (3D LUT) which compensates for the channel interdependencies of the densities ($D_r$, $D_g$, $D_b$) that result from the input signals (R1, G1, B1). The derivation of the appropriate function coefficients or the 3D LUT nodal values can be accomplished using the following physical and computational steps:

1. Initializing the linearization circuitry 26 of the imaging system 18 such that for signals R3=G3=B3, the resulting densities are equivalent $D_r=D_g=D_b$, or nearly equivalent. If the linearization circuitry 26 is not used, then initialize the neutral adjustment circuitry 16 in this manner, such that for inputs R2=G2=B2, resulting densities are $D_r=D_g=D_b$.

2. Setting the parameters of the color correction circuitry 14 and the neutral adjustment circuitry 16 (provided the linearization circuitry 26 is used and is initialized) such that no transformation is applied to the input data and (R3, G3, B3)=(R2, G2, B2)=(R1, G1, B1).

3. Sending a digital image to the image recorder 28, said image consisting of patches of constant color, the number and distribution of the colors chosen to adequately sample the set of all reproducible colors. Each color patch is described by its input signal (R1, G1, B1). In the preferred embodiment, 216 patches of colors are adequate to sample the set of reproducible colors. The 216 colors result from all combinations of six input digital levels for each of the three channels.

4. Measuring the densities of the output hardcopy image of the color patches by the scanner or densitometer 20. These densities ($D_r'$, $D_g'$, $D_b'$) are input into the computer 22. For each sample color resulting from the input signals (R1, G1, B1) there is a corresponding set of densities ($D_r'$, $D_g'$, $D_b'$).

5. Using the input signals (R1, G1, B1) and resulting densities ($D_r'$, $D_g'$, $D_b'$) for all color patches to determine the parameters for the color correction circuitry 14. If the color correction is embodied by functions $F_r$, $F_g$, and $F_b$, such that $R2 = F_r(R1, G1, B1)$
$G2 = F_g(R1, G1, B1)$
$B2 = F_b(R1, G1, B1)$, upon substitution of the preferred relationships described above the functions become $R2 = F_r(f_r(D_r), f_g(D_g), f_b(D_b))$
$G2 = F_g(f_r(D_r), f_g(D_g), f_b(D_b))$
$B2 = F_b(f_r(D_r), f_g(D_g), f_b(D_b))$.

Utilizing the conditions which existed in the system 10 at that time the test color samples were produced, i.e. (R2, G2, B2)=(R1, G1, B1), and the resulting densities from these signals, the above equations can be rewritten as;

$R2 = F_r(f_r(D_r'), f_g(D_g'), f_b(D_b'))$
$G2 = F_g(f_r(D_r'), f_g(D_g'), f_b(D_b'))$
$B2 = F_b(f_r(D_r'), f_g(D_g'), f_b(D_b'))$

The coefficients of the functions can be determined by an iterative technique by which the cumulative errors between the actual signals (R1, G1, B1) applied to imaging device 18 and the values (R2, G2, B2) predicted from the functions $F_r$, $F_g$, and $F_b$, when the actual densities produced ($D_r'$, $D_g'$, $D_b'$) are substituted into those functions, are minimized by successively altering the coefficients of the functions $F_r$, $F_g$, and $F_b$ on an individual basis and re-evaluating the cumulative errors for the total sum of color patches utilized in the calibration procedure. The computer 22 is used to perform the multiple calculations involved in the optimization procedure, and supplies the final optimized function coefficients to the color correction circuitry 14. If the color correction circuitry consists of a series of consecutive functions, the same procedures to determine the function coefficients by iterative trials are performed using the computer 22. Alternatively, if the color correction circuitry utilizes a 3D LUT, the nodal values for the 3D LUT can be determined via interpolation and surface smoothing techniques using the measured values ($D_r'$, $D_g'$, $D_b'$) and the input signal (R1, G1, B1). The nodal values being then supplied to the color correction circuitry 14 by the computer 22.

6. No adjustments are made to the parameters used in the neutral adjustment circuitry. The relationship established at the beginning of this procedure, (R3, G3, B3)=(R2, G2, B2), when the linearization circuitry 26 is used, is initialized.

With the color correction circuitry thus initialized, the digital data source 12 can provide signals (R1, G1, B1) for each image element, such that $R1 = f_r(D_r)$
$G1 = f_g(D_g)$
$B1 = f_b(D_b)$, where ($D_r$, $D_g$, $D_b$) are the desired hardcopy densities for the image elements. The color correction circuit 14 transforms the input image signals (R1, G1, B1) into output signals (R2, G2, B2) using the transformations $F_r$, $F_g$, $F_b$. The neutral adjustment circuitry 16 output (R3, G3, B3) equals the input (R2, G2, B2) if linearization is performed by the linearization circuit 26.

The color correction previously described will correct for channel interdependencies of the output densities ($D_r$, $D_g$, $D_b$) as related to the input analog signals (r, g, b) to the imaging system 18. This conversion is specifically optimized for the conditions of the imaging system that existed at the time that the sample colors used to determine the color correction parameters were produced as hardcopy. In many hardcopy imaging devices, for example film recorders which additively expose photographic film to red, green, and blue light modulated by the signals (r, g, b), the interdependent relationship between the input signals (r, g, b) and the resulting densities ($D_r$, $D_g$, $D_b$) varies dependent upon external conditions, for example the film chemical processing step in the case of a film recorder. Variations in reproduction densities are readily apparent in neutral and near-neutral colors, the portion of color space in which the human eye is sensitive to small changes in hue. Changes in reproduction densities ($D_r$, $D_g$, $D_b$) attributable to such external conditions can be intolerable, and would force recalculation of the color correction circuitry coefficients or 3D LUT following regeneration of the image of color patches. Recalculation of the color correction circuitry coefficients or 3D LUT is costly and time-consuming.

It is the intent of this invention to provide a means by which changes in the relationship between the analog signals (r, g, b) input to the image recorder and the output densities ($D_r$, $D_g$, $D_b$) caused by a change in external conditions can be compensated, without requiring recalculation of the color correction. The invention is embodied by the inclusion of the neutral adjustment circuitry 16 and the procedures by which the neutral correction parameters are derived and utilized.

The development and utilization of the neutral adjustment is accomplished in the following steps:

1. Define an adequate set of "neutral colors", i.e. grays, described ($D_{rn}$, $D_{gn}$, $D_{bn}$). A preferred definition of neutrality is $D_{rn} = D_{gn} = D_{bn}$. An adequate set in the above context includes the neutral colors with the minimum and maximum achievable densities, and at least ten other neutral densities equally spaced between the minimum and maximum neutral densities.

2. Use the defined set of neutral colors to create a digital image consisting of uniform patches of the neutral colors by first transforming the colors ($D_{rn}$, $D_{gn}$, $D_{bn}$) to the digital signals ($R_{1n}$, $G_{1n}$, $B_{1n}$) by the previously defined preferred functions $f_r$, $f_g$, and $f_b$:

$R_{1n} = f_r(D_{rn})$
$G_{1n} = f_g(D_{gn})$
$B_{1n} = f_b(D_{bn})$.

Provided the signals ($R_{1n}$, $G_{1n}$, $B_{1n}$) to the color correction circuitry 14 from the data source 12 or the computer 22. The output signals ($R2_n$, $G2_n$, $B2_n$) from the color correction circuitry 14 are supplied both to the computer 22 and to the neutral adjustment circuitry 16 which has been initialized such that the output signals ($R3_n$, $G3_n$, $B3_n$) from the neutral adjustment circuitry 16 are unchanged from the input signals ($R2_n$, $G2_n$, $B2_n$) if the linearization circuit 26 exists and has been properly initialized in the same manner as described above.

3. The image consisting of neutral colors is produced by the imaging system 18 from the analog signals ($r_n$, $g_n$, $b_n$) which are the analog equivalents of the digital signals ($R4_n$, $G4_n$, $B4_n$), which can be expressed as ($g_r(R3_n)$, $g_g(G3_n)$, $g_b(B3_n)$)). The densities of each neutral color in the hardcopy image are measured by the scanner or densitometer 20, and the measured density signals ($D_{rn}'$, $D_{gn}'$, $D_{bn}'$) are provided to the computer 22. Note that if external conditions are unchanged and the color compensation parameters had been properly optimized, the measured output densities ($D_{rn}'$, $D_{gn}'$, $D_{bn}'$) would equal the desired densities ($D_{rn}$, $D_{gn}$, $D_{bn}$) for each input neutral color, and no further adjustment would be necessary.

4. The computer 22 converts the measured densities of the neutral color samples ($D_{rn}'$, $D_{gn}'$, $D_{bn}'$) to the nominal input signals ($R_{1n}'$, $D_{1n}'$, $B_{1n}'$) by the previously defined functions $f_r$, $f_g$, and $f_b$:

$R_{1n}' = f_r(D_{rn}')$
$G_{1n}' = f_g(D_{gn}')$
$B_{1n}' = f_b(D_{bn}')$.

The resulting signals ($R_{1n}'$, $G_{1n}'$, $B_{1n}'$) for each neutral color sample are provided to the color correction circuitry 14 to determine the output signals ($R2_n'$, $G2_n'$, $B2_n'$). The computer 22 associates the signals ($R2_n'$, $G2_n'$, $B2_n'$) determined by this procedure for each neutral color produced by the hardcopy device with the actual signals ($R3_n$, $G3_n$, $B3_n$) that had been applied to the imaging system 18 during the hardcopy production of the neutral color samples. If the linearization circuit 26 is used and is initialized, the signals ($R3_n$, $G3_n$, $B3_n$) = ($R2_n$, $G2_n$, $B2_n$).

Using the resulting sets ($R3_n$, $G3_n$, $B3_n$) and ($R2_n'$, $G2_n'$, $B2_n'$), channel independent functions $m_r$, $m_g$, $m_b$ can be developed by the computer 22, such that $R3_n = m_r(R2_n')$
$G3_n = m_g(G2_n')$
$B3_n = m_b(B2_n')$.

An interpolation method is used to determine the appropriate output value $R3_n$ for every possible input value $R2_n'$, the appropriate output value $G3_n$ for every possible input value $G2_n'$, and the appropriate output value $B3_n$ for every possible input value $B2_n'$. The resulting relationships are implemented in the form of three independent 1-dimensional look-up tables, one table for each of the three channels. The tables are downloaded from the computer 22 to the neutral correction circuitry 16. In use, all channel-independent signals (R2, G2, B2) output from the color correction circuitry 14 are converted to signals (R3, G3, B3) by the functions $m_r$, $m_g$, and $m_b$ which are installed as 1-dimensional look-up tables in the neutral adjustment circuitry 16. If the imaging system 18 did not utilize a linearization circuit 26, and the linearization process is performed by the neutral adjustment circuitry 16, this procedure results in an adjustment of the linearization functions installed in the neutral adjustment circuitry 16 to maintain the desired density outputs.

This procedure to determine the neutral adjustment look-up tables is simple and is accomplished under total control of the computer 22. It can be done as frequently as necessary to adjust for changes in the external conditions which affect the final image densities.

The present invention has been optimized to operate with a digital image (film) recorder 28 that replicates, in hardcopy form on photographic film, a digitized image from any source. It is assumed that the three channel digital data input into the reproduction system represents the desired color characteristics of the output hardcopy. An example of such representation would be red, green, and blue densities measurable from the output hardcopy. The method of the present invention operates upon the (desired) color densities with a color correction that has as its input the desired densities and which then calculates the nominal digital drive signals (AIM device code values) needed to produce these densities on the processed film. In the context of the above description, the AIM device code values are embodied by the signals (R2, G2, B2). The AIM code values are further modified by a neutral calibration model which is comprised of three 1-dimensional digital look-up tables that compensate for any effect of short-term film chemical process variations upon neutral reproduction. In the context of the above descriptions, the modified signals are embodied by the signals (R3, G3, B3) provided to the imaging system, which includes a linearization circuit to convert input signals (R3, G3, B3) to digital drive signals (R4, G4, B4) for the D/A converters.

Figure 2:
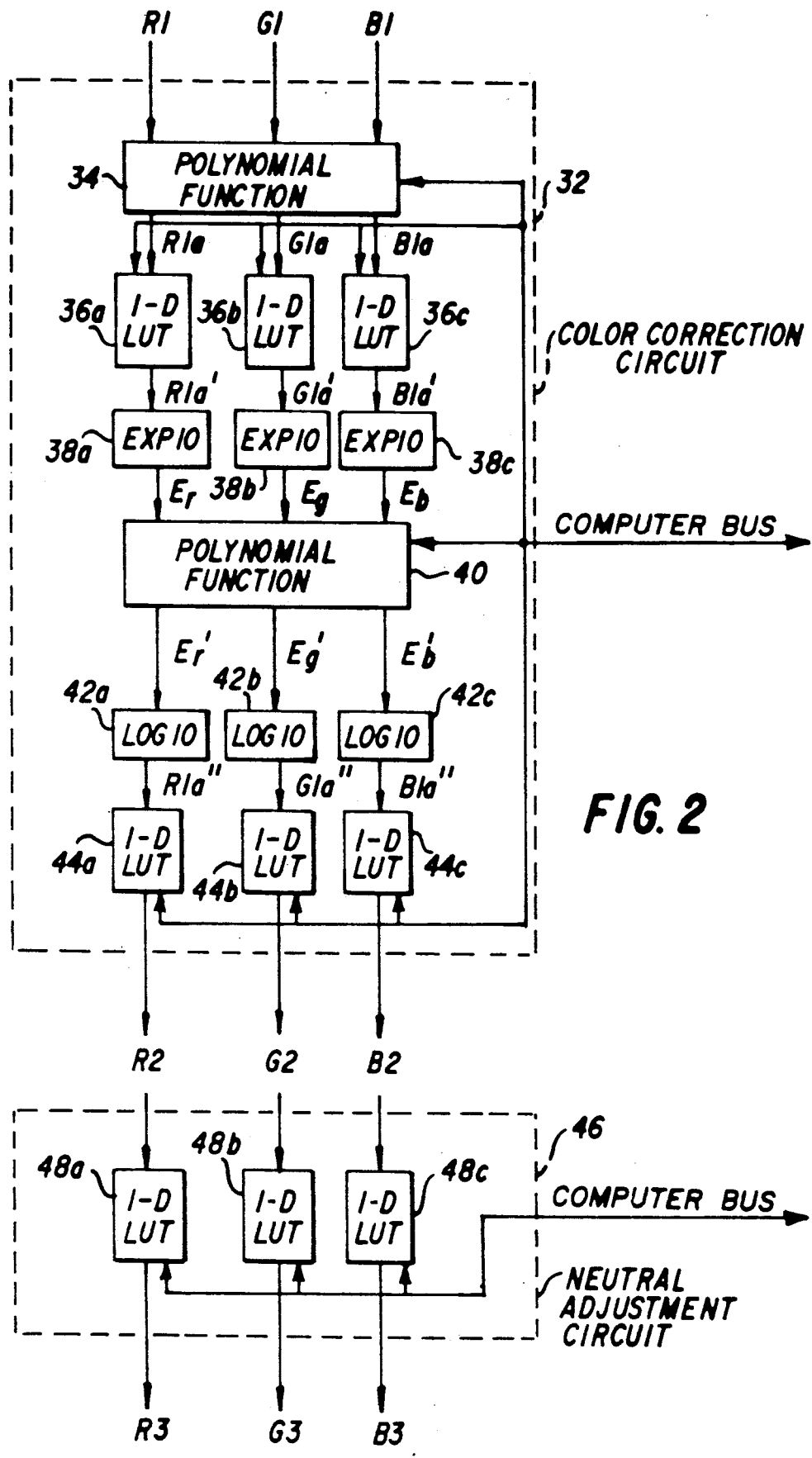
FIG. 2 is a more detailed schematic block diagram illustrating a portion of the preferred embodiment of FIG. 1.

In one preferred embodiment of the invention, the color correction circuitry 14 is comprised of a series of functions shown in expanded form as module 32 in FIG. 2. Incoming signals (R1, G1, B1) to the module 32 are first modified by a polynomial function 34 such that;

$$R1_a = K_r(R1, G1, B1) = \sum_{i=o}^{n} \sum_{j=o}^{n} \sum_{k=o}^{n} a_{ijk} R1^i G1^j B1^k$$

$$G1_a = K_g(R1, G1, B1) = \sum_{i=o}^{n} \sum_{j=o}^{n} \sum_{k=o}^{n} b_{ijk} R1^i G1^j B1^k$$

$$B1_a = K_b(R1, G1, B1) = \sum_{i=o}^{n} \sum_{j=o}^{n} \sum_{k=o}^{n} c_{ijk} R1^i G1^j B1^k$$

When n is the order of the polynomial, $a_{ijk}$ is the coefficient of the $R^i G^j B^k$ term in the polynomial $K_r$, When n is the order of the polynomial, $b_{ijk}$ is the coefficient of the $R^i G^j B^k$ term in the polynomial $K_g$, and When n is the order of the polynomial, $c_{ijk}$ is the coefficient of the $R^i G^j B^k$ term in the polynomial $K_b$.

In the preferred embodiment, the order of the polynomial is 2, although higher orders may be necessary depending on the color hardcopy media used in the imaging device 18.

The output values (R1a, G1a, B1a) from the polynomial function 34 are directed to three channel-independent 1-dimensional look-up tables 36a through 36c, from which a digital output R1a' is provided for every input R1a, a digital output G1a' is provided for every input G1a, and a digital output B1a' is provided for every input B1a. In the preferred embodiment the tables 36a through 36c are digital representations of the reversed sensitometric response of the film to a scale of optical neutral exposures. A continuous representation of this relationship for reversal film is graphically illustrated in FIG. 3.

The output values (R1a', G1a', B1a') from the tables 36a through 36c are expontiated (base 10) by circuits 38a through 38c, providing signals ($E_r$, $E_g$, $E_b$). These signals are provided to a second polynomial function 40 which outputs the signals ($E_r'$, $E_g'$, $E_b'$). In the preferred embodiment, the function 40 is of the form;

$E_r' = k_{11}E_r + k_{12}E_g + k_{13}E_b$
$E_g' = k_{21}E_r + k_{22}E_g + k_{23}E_b$
$E_b' = k_{31}E_r + k_{32}E_g + k_{33}E_b$ where, $k_{ij}$ = the coefficient for the appropriate term of the polynomial. This polynomial serves as a second compensation stage for channel interdependencies, operating in the linear (exposure) domain as opposed to the log (density) domain.

The output signals ($E_r'$, $E_g'$, $E_b'$) from the polynomial module 40 are provided as inputs to the circuits 42a through 42c which provide as output signals (R1a'', G1a'', B1a'') the logarithms (base 10) of the input signals.

The output signals (R1a'', G1a'', B1a'') from the circuits 42a through 42c are provided as inputs to the three channel-independent 1-dimensional look-up tables 44a through 44c, from which a digital output R2 is provided for every input R1a'', a digital output G2 is provided for every input G1a'', and a digital output B2 is provided for every input B1a''. In the preferred embodiment the tables 44a and 44c are digital representations of the sensitometric response of the film to a scale of optical neutral exposures. A continuous representation of this relationship for reversal film is graphically illustrated in FIG. 4. This embodiment is the inverse of the relationship graphically illustrated in FIG. 3. The signals (R2, G2, B2) are the outputs from the color correction module 32.

The output signals (R2, G2, B2) from the color correction module 32 are provided as inputs to a neutral adjustment circuit 46. This circuit consists of three channel-independent 1-dimensional look-up tables 48a through 48c which transform the R2 signal to R3, the G2 signal to G3, and the B2 signal to B3. The signals (R3, G3, B3) comprise the digital drive signals subsequently applied to the linearization circuit 26 associated with the image recorder 28.

Figure 5:
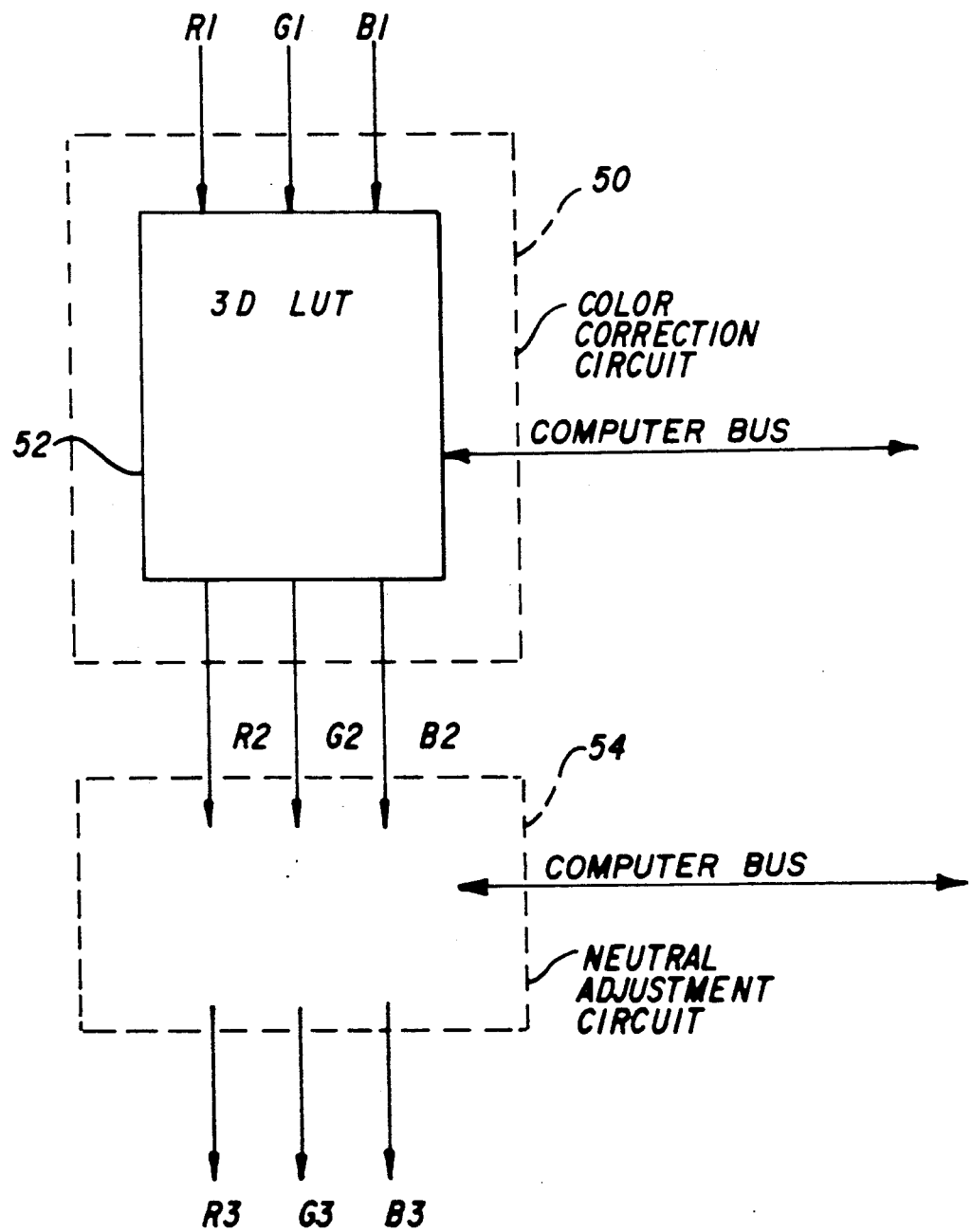
FIG. 5 is a more detailed schematic block diagram illustrating a second configuration for the portion of the preferred embodiment of FIG. 2.

A second preferred embodiment of the invention utilizes a three-dimensional look-up table (3D LUT) 52 illustrated in FIG. 5 as a color correction module 50 to determine the signals (R2, G2, B2) for a set of input signals (R1, G1, B1). The outputs (R2, G2, B2) from the 3D LUT circuit 52 are inputs to a neutral adjustment circuit 54.

An example of the utility of this invention is described in the following procedures and results obtained when reversal color film was exposed by a film recorder and processed through a standard reversal film processor, which was run conforming to established process control procedures, and which produced film densities within the control limits established for the process. The imaging system included a linearization circuitry which was initialized at the time the color correction functions were derived such that for signals satisfying the condition R3=G3=B3 input to the linearization circuitry, the proper outputs R4, G4, and B4 were provided to the D/A converters such that the densities $D_r = D_g = D_b$ were produced on the film after processing.

For this example, referring to FIG. 1, the signals (R1, G1, B1) provided from the data source 12 are defined to be equivalent to the desired red, green, and blue densities as measured by the densitometer 20. That is, R1 = $D_r$
G1 = $D_g$
B1 = $D_b$.

Referring to FIG. 2, for this example, the polynomial function 34 takes the form:

R1a = 1.09R1 − 0.08G1 − 0.01B1 + 0.01R1² − 0.02R1-G1 + 0.01R1B1

$G1a = -0.08R1 + 1.12G1 - 0.04B1 + 0.12G1^2 - 0.06 R1G1 - 0.06G1B1$ $B1a = -0.02R1 - 0.24G1 + 1.26B1 - 0.04B1^2 + 0.04 R1B1$

Note that for each function, the coefficients of the linear (first order) terms sum to 1.0 and the coefficients of the second order terms sum to zero. The utility of this restriction is such that if the input signals $R1 = G1 = B1$, then the output signals $R1a = G1a = B1a$.

Figure 3:
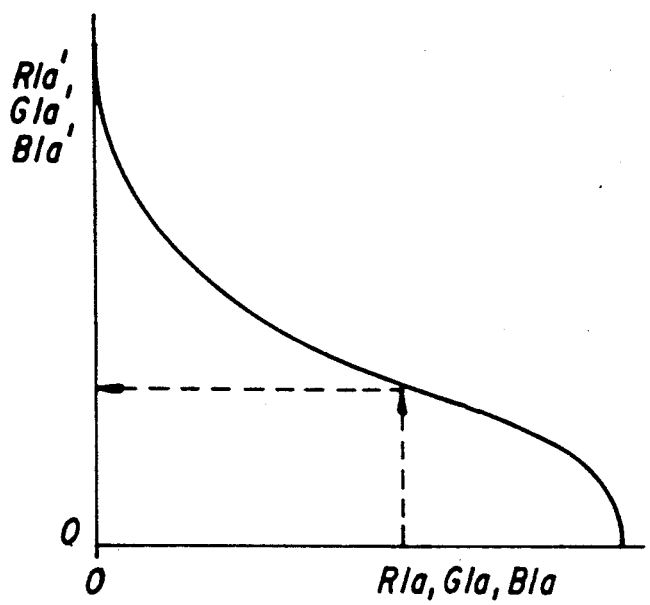
FIG. 3 is a chart graphically illustrating the operation of a first look-up table used in the portion of the preferred embodiment illustrated in FIG. 2.

The signals ($R1a$, $G1a$, $B1a$) are input to the look-up tables 36a through 36c shown graphically in FIG. 3. Note that the same look-up table is used for each of the three independent signals $R1a$, $G1a$, $B1a$. The utility of this form is that if $R1a = G1a = B1a$, then $R1a' = G1a' = B1a'$. These signals are subsequently exponentiated in the manner previously described, with the resulting signals ($E_r$, $E_g$, $E_b$) modified by the following function (module 40 in FIG. 2):

$E_r' = 1.04E_r - 0.03E_g - 0.01E_b$
$E_g' = 0.01E_r + 1.01E_g - 0.02E_b$
$E_b' = 0.01E_r - 0.01E_g + 1.00E_b$

Note that the coefficients of each function sum to 1.0. The utility of this form is that if input signals $E_r = E_g = E_b$, the output signals $E_r' = E_g' = E_b'$.

Figure 4:
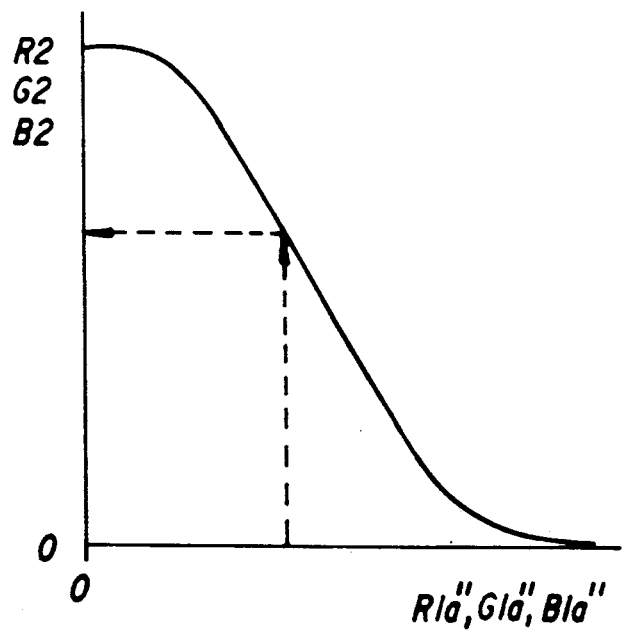
FIG. 4 is a chart graphically illustrating the operation of a second look-up table used in the portion of the preferred embodiment illustrated in FIG. 2.

The output signals ($E_r'$, $E_g'$, $E_b'$) are supplied to the circuitry to obtain logarithms and are subsequently modified by the 1-dimensional look-up tables 44a through 44c illustrated graphically by FIG. 4, providing the output signals ($R2$, $G2$, $B2$). Note that the same form of the look-up table is used for all three independent channels such that if $E_r' = E_g' = E_b'$, the output signals from the logarithm circuitry $R1a'' = G1a'' = B1a''$ and the output signals from the look-up tables $R2 = G2 = B2$.

The utility of the above restrictions on the functions and look-up tables is that if "neutral colors" are defined as colors having desired densities $D_r = D_g = D_b$, then $R1 = G1 = B1$, and the outputs of the functioning color correction circuitry are $R2 = G2 = B2$, and are equivalent to the input signals.

When the coefficients of the color correction functions were derived according to the procedures described earlier, the restrictions assured that given the state of the film chemical process at the time of processing of the color samples, the initialization of the neutral adjustment circuit such that ($R3$, $G3$, $B3$) = ($R2$, $G2$, $B2$), and the proper initialization of the linlarization circuitry, for any set inputs satisfying the condition $R1 = G1 = B1$, the resulting densities from the hardcopy system will be $D_r = D_g = D_b$. This condition provides a convenient method by which to monitor the response of the imaging system to input values $R3 = G3 = B3$, and to use the response of the imaging system to those inputs to determine the neutral adjustment functions necessary to maintain the desired response $D_r = D_g = D_b$.

Figure 6:
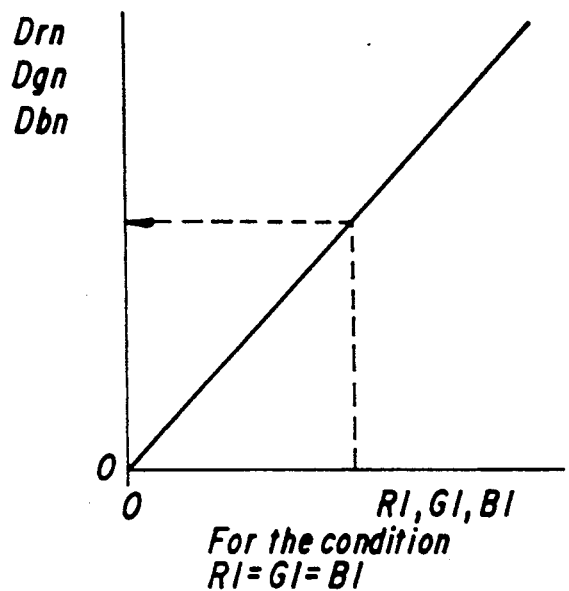
FIG. 6 is a chart illustrating the response of the present apparatus to neutral color conditions R1=G1=B1 in terms of desired densities $D_{rn}$, $D_{gn}$, and $D_{bn}$.

FIG. 6 graphically illustrates the actual response of the imaging system to inputs satisfying the neutral color condition $R1 = G1 = B1$ in terms of the measured densities $D_{rn}$, $D_{gn}$, and $D_{bn}$ when the imaging system was properly linearized and the film process conditions were like those that existed at the time of calibration. Note that all three density responses are identical. Also note that because of the restrictions in the color correction circuitry $R2 = R1$, $G2 = G1$, $B2 = B1$.

Figure 7:
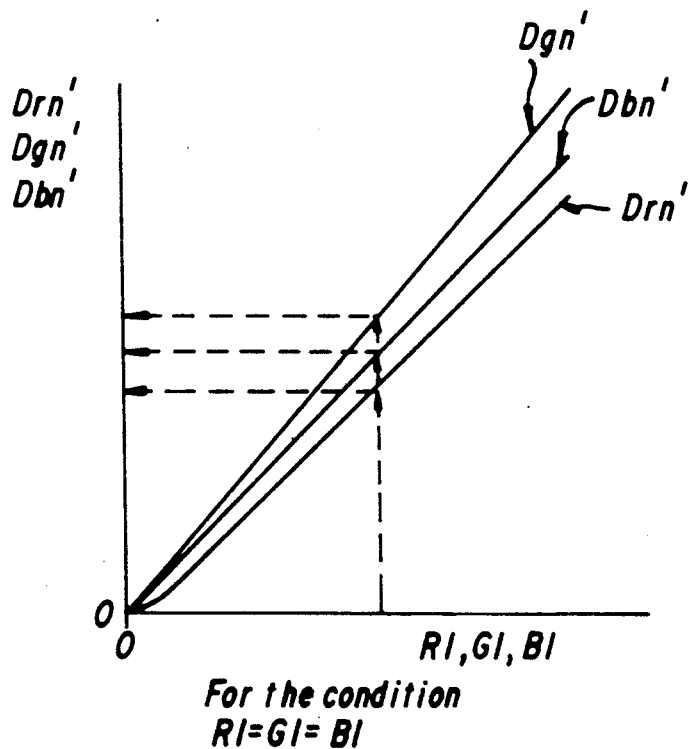
FIG. 7 is a chart illustrating the response of the present apparatus to neutral color conditions R1=G1=B1 at a time when the film process conditions have changed.

FIG. 7 graphically illustrates the actual response of the imaging system to the same inputs $R1 = G1 = B1$ at a later time when the film process conditions had changed. Because of the restrictions previously described, the color correction circuit produced signals $R2 = R1$, $G2 = G1$, and $B2 = B1$. The neutral adjustment circuit and the linearization of the imaging device were unchanged from the earlier experiment such that $R3 = R2$, $G3 = G2$, and $B3 = B2$. Note that the resulting densities $D_{rn}'$, $D_{gn}'$, $D_{bn}'$ are no longer equivalent. Using the resulting densities ($D_{rn}'$, $D_{gn}'$, $D_{bn}'$) as inputs ($R1_n'$, $G1_n'$, $B1_n'$) to the color correction circuitry, the signals ($R2_n'$, $G2_n'$, $B2_n'$) are created. The signals ($R2_n'$, $G2_n'$, $B2_n'$) are substituted for the densities ($D_{rn}'$, $D_{gn}'$, $D_{bn}'$), graphically illustrated in FIG. 7, that are associated with each actual input signal $R1 = G1 = B1$. Recognizing that for the condition established above, $R3 = R1$, $G3 = G1$, $B3 = B1$, the result is graphically illustrated in FIG. 8, with inputs ($R3_n$, $G3_n$, $B3_n$) and outputs ($R2_n'$, $G2_n'$, $B2_n'$). Recall that the necessary relationships for the new neutral adjustment are:

$R3_n = m_r(R2_n')$
$G3_n = m_r(G2_n')$
$B3_n = m_r(B2_n')$.

Figure 8:
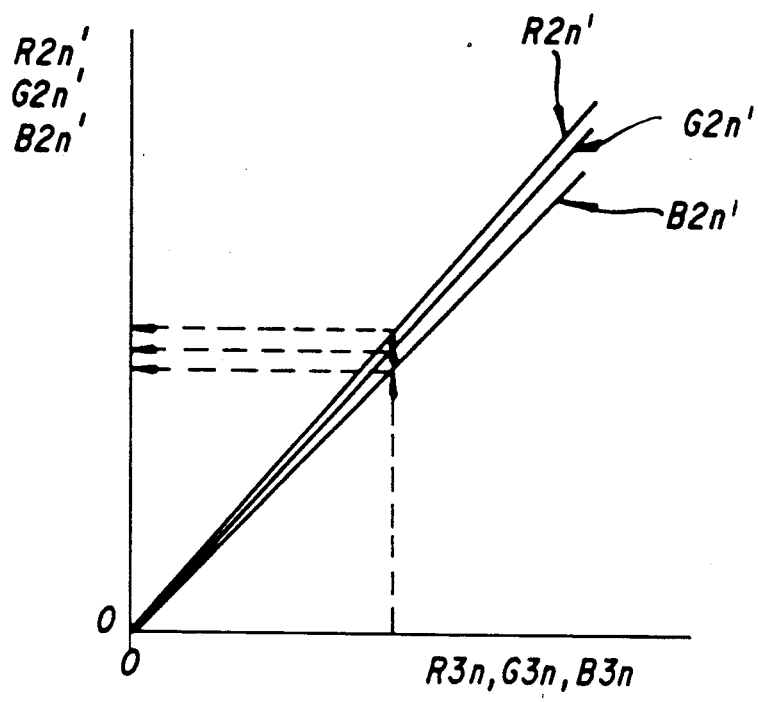
FIG. 8 is a chart illustrating the response shown in FIG. 7 when modified by the color correction circuitry and the appropriate substitutions are made.
Figure 9:
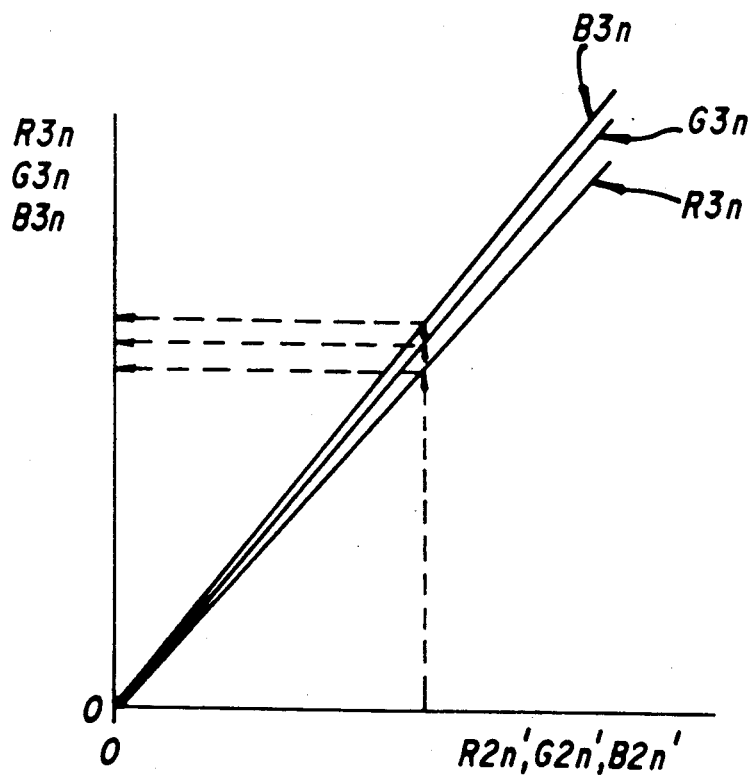
FIG. 9 is a chart illustrating the inverse of the relationships illustrated in the chart of FIG. 8.

These relationships are established by inverting the relationships graphically illustrated in FIG. 8. The resulting functions, illustrated in FIG. 9, are installed in the neutral adjustment circuitry to compensate for the conditional changes in the film process.

While there has been shown what are considered to be the preferred embodiments of the present invention, it will be manifest that many changes and modifications may be made therein without departing from the essential spirit of the invention. It is intended, therefore, in the annexed claims, to cover all such changes and modifications as may fall within the true scope of the invention.

I claim:

1. A method for calibrating a hardcopy device of the type that transforms an original color image into signals that are used to drive a reproduction device to create a copy of the original color image comprising the steps of:

a. processing through said hardcopy device a first test color image having patterns of desired color densities to create a copy of the first test color image;

b. determining the differences in densities between the color patterns of said first color test image and the copy of said first test color image;

c. adjusting said hardcopy device to drive said differences to zero;

d. processing through said hardcopy device a second test color image having patterns of desired neutral color densities to create a copy of said second test color image;

e. determining the differences in the neutral color densities between said second test color image and the copy of said second test color image; and f. adjusting said hardcopy device to drive said differences in neutral color densities towards zero without thereby effecting the color imaging processing steps, a, b, c, to thereby calibrate said hardcopy device.

2. The method for calibrating a hardcopy device according to claim 1 wherein the determined differences of step b are stored until the differences of step e are determined and the adjustments to the hardcopy device of steps c and f are accomplished in one step.

3. A method for calibrating a hardcopy device of the type that transforms an original color image into signals which are used to drive a reproduction device to create a copy of the original color image comprising the steps of:
   a. processing through said hardcopy device a first test color image having patterns of known true color densities to create a copy of said first test color image;
   b. determining the differences in densities between the color patterns of said first test color image and the copy of said first test color image;
   c. adjusting said hardcopy device to drive said differences to zero;
   d. processing through said hardcopy device a second test color image having patterns of known true neutral color densities to create a copy of said second test color image;
   e. determining the differences in the neutral color densities between said second test color image and the copy of said second test color image; and
   f. adjusting said hardcopy device to drive said differences in neutral color densities towards zero without thereby effecting the color imaging processing steps a, b, c, to thereby calibrate said hardcopy device.

4. The method for calibrating a hardcopy device according to claim 3 wherein the determined differences of step b are stored until the differences of step e are determined and the adjustments to the hardcopy device of steps c and f are accomplished in one step.

5. A method for calibrating a color digital hardcopy device having a data source for generating at least three independent channel signals indicative of the colors of an original image, a color correction circuit having at least three independent channels each receiving one of the generated signals and applying a color correction parameter thereto, a neutral correction circuit receiving generated signals from the color correction circuit and applying a neutral correction paramater thereto, and an image recorder means for receiving the signal from said neutral correction circuit and for forming an image on a recording medium corresponding to the signals received from said correction circuit comprising the steps of:
   a. initializing the color correction parameters of said color correction circuit to initial values;
   b. sending an image from said data source to said color correction circuit, the image comprised of patches of constant color, the number and the distribution of the colors chosen to adequately represent the colors recordable on said recording medium;
   c. measuring the densities of the hardcopy image of the patches of constant color;
   d. storing the measured densities of step c;
   e. determining from the measured densities color correction parameters which are used to correct for channel interdependencies;
   f. directing the color correction parameters determined from the measured densities to said color correction circuit for adjusting the color correction parameters applied by said color correction circuit; and,
   g. transforming the three independent channel signals from the color correction circuit by channel independent transform functions.

6. The method according to claim 5, wherein said color correction circuit performs the steps of:
   a. modifying the at least three independent channel signals from said data source by a first polynomial function;
   b. transforming each of the three or more modified independent channel signals by a reversed sensitometric recording medium response function;
   c. exponentiating the three or more transformed independent channel signals from step b;
   d. modifying the three or more exponentiated independent channel signals from step c by a second polynomial function;
   e. taking the logarithm of the three or more modified independent channel signals from step d; and
   f. transforming the three or more independent channel signals from step e by a sensitometric recording medium response function and providing the transformed signals to said image recorder means.

7. The method according to claim 6 wherein the modified three or more independent channel signals of step a are transformed in step b by the use of look-up tables.

8. The method according to claim 6 wherein the three or more independent channel signals of step e are transformed in step f by the use of look-up tables.

9. A method for calibrating a color digital hardcopy device according to claim 6, wherein the transformed three or more independent channel signals of step b are exponentiated in step c by the use of look-up tables.

10. A method for calibrating a color digital hardcopy device according to claim 6, wherein the modified three or more independent channel signals of step d are transformed in step e by the use of look-up tables.

11. A method for calibrating a color digital hardcopy device according to claim 6, wherein the transforms in steps b and c are combined and implemented by look-up tables.

12. A method for calibrating a color digital hardcopy device according to claim 6, wherein the transforms in steps e and f are combined and implemented by look-up tables.

13. The method according to claim 5 and further comprising the step of: linearizing the three or more independent channel signals from said color correction circuit.

14. The method according to claim 5 wherein the three or more independent channel signals are transformed by neutral color transform functions through the use of look-up tables.

15. The method according to claim 5 wherein the neutral color transform functions are formed by the steps of:
   a. defining a set of neutral colors with a range of density values;
   b. generating said at least three independent channel signals from the defined set of neutral colors and applying said at least three independent channel signals to said color correction circuit;
   c. measuring the densities of the hardcopy image of the neutral color image;
   d. determining appropriate channel independent functions for each measured density; and
   e. incorporating the determined channel independent functions as said neutral color transform functions.

16. The method according to claim 15 wherein the determined channel independent functions are incorporated by the use of look-up tables.

17. The method according to claim 15 wherein step d is performed by the steps of: converting the measured densities of the neutral color samples ($D_{rn}'$, $D_{gn}'$, $D_{bn}'$) to nominal input signals ($R_{1n}'$, $G_{1n}'$, $B_{1n}'$) by functions $f_r$, $f_g$, and $f_b$, wherein $R_{1n}' = f_r(D_{rn}')$
$G_{1n}' = f_g(D_{gn}')$
$B_{1n}' = f_b(D_{bn}')$ with the resulting signals ($R_{1n}'$, $G_{1n}'$, $B_{1n}'$) for each neutral color sample provided to said color correction circuit to determine the output signals ($R2_n'$, $G2_n'$, $B2_n'$);

a. comparing the signals ($R2_n'$, $G2_n'$, $B2_n'$) determined by this procedure for each neutral color produced by said hardcopy device with the actual signals ($R3_n$, $G3_n$, $B3_n$) received by the color digital hardcopy device during the hardcopy production of the neutral color samples;

b. using the resulting sets ($R3_n$, $G3_n$, $B3_n$) and ($R2_n'$, $G2_n'$, $B2_n'$), develop channel independent functions $m_r$, $m_g$, $m_b$ such that $R3_n = m_r(R2_n')$
$G3_n = m_g(G2_n')$
$B3_n = m_b(B2_n')$; and c. determining the appropriate output value $R3_n$ for every possible input value $R2_n'$, the appropriate output value $G3_n$ for every possible input value $G2_n'$, and the appropriate output value $B3_n$ for every possible input value $B2_n'$.

18. A method for calibrating a color digital hardcopy device according to claim 5, wherein the data source generates at least three independent channel signals indicative of the colors of a video image.

19. A method for calibrating a color digital hardcopy device according to claim 5, wherein the data source generates at least three independent channel signals indicative of the colors of a computer-generated image.

20. A method for calibrating a color hardcopy device of the type which converts three independent channel signals representing an original image into a hardcopy of the original image and incorporates a color correction circuit, and a hardcopy forming means comprising the steps of:

a. forming a hardcopy of three independent channel signals representing an image of constant color patches by processing through said hardcopy device;

b. measuring the densities of the constant color patches formed on said hardcopy;

c. determining from the measured densities color correction parameters to be used by said color correction circuit;

d. forming a hardcopy of three independent channel signals representing an image of neutral colors having a range of densities by processing through said hardcopy device;

e. measuring the densities of the neutral colors formed on said hardcopy; and f. determining from the measured densities, of step e, neutral density correction parameters to be used by said neutral color adjustment circuit, without effecting thereby adjustment to the color correction circuit.

21. The method according to claim 20 wherein said color correction circuit performs the steps of:

a. modifying the three independent channel signals from a data source by a first polynomial function;

b. transforming each of the modified three independent channel signals by a reversed sensitometric recording medium response function;

c. exponentiating the transformed three independent channel signals from step b;

d. modifying the exponentiated three independent channel signals from step c by a second polynomial function;

e. taking the logarithm of the modified three independent channel signals from step d; and f. transforming the three independent channel signals from step e by a sensitometric recording medium response function and providing the transformed signals to a hardcopy forming means.

22. The method according to claim 21 wherein the modified three independent channel signals of step a are transformed in step b by the use of look-up tables.

23. The method according to claim 21 wherein the three independent channel signals of step e are transformed in step f by the use of look-up tables.

24. A method for calibrating a color digital hardcopy device according to claim 21, wherein the transforms in steps e and f are combined and implemented by look-up tables.

25. The method according to claim 20 and further comprising the step of: linearizing the three independent channel signals from said color correction circuit.

26. An apparatus for calibrating a color digital hardcopy device, said device having a data source for generating at least three independent channel signals indicative of an original image and an image recorder for receiving independent channel signals and for producing a hardcopy in response to the received signals comprising:

a. color correction means receiving said at least three independent channel signals for providing density compensated independent channel signals;

b. neutral adjustment means independent from the color correction means for receiving said density compensated independent channel signals for providing independent neutral adjustment factors to said density compensated independent channel signals;

c. imaging system means including the image recorder for receiving the signals from the neutral adjustment means and for providing a hardcopy in accordance with said received signals;

d. means for scanning the hardcopy from said imaging system means for providing at least three independent density signals representative of the density of the image recorded on said hardcopy; and e. computer means responsive to said at least three independent density signals for providing color and neutral density correction parameters to said color correction means and said neutral adjustment means, respectively.

27. The apparatus according to claim 26 wherein said color correction means is comprised of:

a. first polynomial means for applying an nth order polynomial factor to said at least three independent channel signals;

b. sensitometric means coupled to said first polynomial means for providing an independent reversed sensitometric response function to the factored independent channel signals;

c. exponentiating means coupled to said sensitometric means for exponentiating each of said independent channel signals;

d. second polynomial means coupled to said exponentiating means for additional modification to the channel signals in an interdependent sense;

e. log means for taking the logarithm of each of the independent channel signals provided by said second polynomial means; and f. sensitometric means coupled to said log means for providing an independent sensitometric response function to each of the independent channel signals provided by said log means.

28. The apparatus according to claim 26 wherein said neutral adjustment means is comprised of a plurality of look-up tables each associated with a corresponding independent channel signal and wherein said table values are provided by the computer means.

29. The apparatus according to claim 26 wherein said color correction means is a look-up table the table values of which are provided by said computer means.

30. The apparatus according to claim 26 wherein said imaging system means incorporates a linearization means for each independent channel signal.

31. The apparatus according to claim 30 wherein said imaging system means incorporates digital to analog circuit means for each independent channel signal.

32. The apparatus according to claim 30, wherein the imaging system incorporates an adjustable linearization means, addressable by said computer means, which can provide the neutral adjustment means by a plurality of look-up tables each associated with a corresponding independent channel signal, and wherein the table values are provided by the computer means.

* * * * *